US011723001B2

(12) United States Patent
Hakola et al.

(10) Patent No.: US 11,723,001 B2
(45) Date of Patent: *Aug. 8, 2023

(54) DISCOVERY SIGNAL BLOCK MAPPING

(71) Applicant: NOKIA SOLUTIONS AND NETWORKS OY, Espoo (FI)

(72) Inventors: Sami-Jukka Hakola, Kempele (FI); Esa Tapani Tiirola, Kempele (FI); Kari Pekka Pajukoski, Oulu (FI); Eeva Lahetkangas, Oulu (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 135 days.

This patent is subject to a terminal disclaimer.

(21) Appl. No.: 17/343,222

(22) Filed: Jun. 9, 2021

(65) Prior Publication Data

US 2021/0298018 A1    Sep. 23, 2021

Related U.S. Application Data

(63) Continuation of application No. 16/705,905, filed on Dec. 6, 2019, now Pat. No. 11,064,485, which is a
(Continued)

(51) Int. Cl.
*H04W 72/04* (2023.01)
*H04L 5/00* (2006.01)
(Continued)

(52) U.S. Cl.
CPC ....... *H04W 72/0446* (2013.01); *H04L 5/0053* (2013.01); *H04W 48/12* (2013.01); *H04W 48/16* (2013.01); *H04W 72/1263* (2013.01)

(58) Field of Classification Search
CPC ............... H04L 5/0053; H04W 48/12; H04W 72/0446; H04W 48/18; H04W 72/1263
See application file for complete search history.

(56) References Cited

U.S. PATENT DOCUMENTS 8,599,715 B2    12/2013  Kim et al.
8,902,858 B2    12/2014  Liu
(Continued)

FOREIGN PATENT DOCUMENTS

CN    102461067 A    5/2012
CN    104703200 A    6/2015
(Continued)

OTHER PUBLICATIONS

Third Chinese Office Action issued in corresponding Chinese Patent Application No. 201680082306.3, dated Jul. 2, 2021, with English summary thereof.
(Continued)

*Primary Examiner* — Brian D Nguyen
(74) *Attorney, Agent, or Firm* — Squire Patton Boggs (US) LLP

(57) ABSTRACT

Systems, methods, apparatuses, and computer program products for signal block mapping are provided. One method includes configuring, by a network node (e.g., base station or eNB), a group of discovery signaling blocks. The method may then include mapping the discovery signaling blocks of the group onto a subframe structure, including the group information into each of the discovery signaling blocks, and transmitting the discovery signaling blocks in the subframe structure.

20 Claims, 13 Drawing Sheets

Related U.S. Application Data continuation of application No. 14/993,296, filed on Jan. 12, 2016, now Pat. No. 10,536,940.

(51) Int. Cl.
| | | |
|---|---|---|
| *H04W 48/12* | (2009.01) | |
| *H04W 48/16* | (2009.01) | |
| *H04W 72/12* | (2023.01) | |
| *H04W 72/0446* | (2023.01) | |
| *H04W 72/1263* | (2023.01) | |

(56) References Cited

U.S. PATENT DOCUMENTS

| | | |
|---|---|---|
| 9,763,151 B2 | 9/2017 | Kim |
| 2014/0171073 A1 | 6/2014 | Kim et al. |
| 2014/0241256 A1 | 8/2014 | Jiang et al. |
| 2014/0242963 A1 | 8/2014 | Novlan et al. |
| 2015/0133102 A1 | 5/2015 | Sorrentino |
| 2015/0326359 A1 | 11/2015 | Subramanian et al. |
| 2016/0142898 A1 | 4/2016 | Poitau et al. |
| 2016/0164653 A1 | 6/2016 | Wang et al. |
| 2016/0242105 A1 | 8/2016 | Schier et al. |
| 2016/0338124 A1 | 11/2016 | Byun et al. |
| 2017/0188221 A1* | 6/2017 | Lee ............... H04W 8/005 |
| 2018/0020339 A1* | 1/2018 | Agiwal ............ H04W 12/08 |
| 2018/0146478 A1* | 5/2018 | Kim ............... H04W 76/14 |
| 2018/0176759 A1* | 6/2018 | Muraoka ............ H04W 8/005 |
| 2018/0176892 A1* | 6/2018 | Kim ............... H04W 52/386 |
| 2018/0199206 A1* | 7/2018 | Muraoka ............ H04W 8/005 |
| 2018/0220308 A1 | 8/2018 | Miao et al. |
| 2018/0249461 A1 | 8/2018 | Miao et al. |
| 2018/0262976 A1 | 9/2018 | Wang et al. |
| 2018/0308087 A1* | 10/2018 | Maimon ............ H04L 9/0822 |
| 2018/0338319 A1* | 11/2018 | Kim ............... H04L 5/0053 |
| 2020/0036420 A1 | 1/2020 | Kishiyama et al. |
| 2020/0045622 A1 | 2/2020 | Kim et al. |

FOREIGN PATENT DOCUMENTS

| | | |
|---|---|---|
| CN | 104734762 A | 6/2015 |
| EP | 2 843 984 A1 | 3/2015 |
| EP | 3 101 942 A1 | 12/2016 |
| WO | 2013/161587 A1 | 10/2013 |
| WO | 2015/109153 A1 | 7/2015 |
| WO | 2015/115376 A1 | 8/2015 |

OTHER PUBLICATIONS

Office Action issued in corresponding Vietnamese Patent Application No. 1-2018-03460 dated Apr. 29, 2022, with English translation thereof.

First Office Action issued in corresponding Chinese U.S. Appl. No. 16/905,705, dated May 21, 2020, with English translation thereof.

3GPP TR 37.842 V1.0.0 (Sep. 2014), Technical Report, 3rd Generation Partnership Project; Technical Specification Group Radio Access Network; E-UTRA and UTRA; Radio Frequency (RF) requirement background for Active Antenna System (AAS) Base Station (BS) (Release 12), Sep. 2014, 29 pages.

IEEE; IEEE Std 802.11ad?-2012-Part 11: Wireless LAN Medium Access Control (MAC) and Physical Layer (PHY) Specifications; Amendment 3: Enhancements for Very High Throughput in the 60 GHz Band; 2012.

Nokia et al., R1-165364, Support for Beam Based Common Control Plane; May 13, 2016; URL: http://www.3gpp.org/ftp .sg_ranIWGl RL ITTSGRI_85/Docs/ [retrieved on May 13, 2016] section 2 Frame structure support for beam based ; ommon control.

International Search Report issued in International Application No. PCT/U.S. Appl. No. 16/905,705, dated Jan. 10, 2017.

Office Action received May 3, 2019 corresponding to Thailand Patent Application No. 1801004165, and English translation thereof.

First Examination Report issued in corresponding Indian Patent Application No. 201517024959 dated Aug. 20, 2020.

Second Office Action issued in corresponding Chinese patent application No. 201680082306.3 dated Nov. 18, 2020, with English summary thereof.

Communication pursuant to Article 94(3) EPC issued in corresponding European Patent Application No. 16 804 750.4, dated May 27, 2021.

European Communication pursuant to Article 94(3) EPC, corresponding to EP Application No. 16 804 750.4, dated Feb. 9, 2023.

Malaysian Office Action corresponding to MY Application No. PI 2018001279, dated Feb. 8, 2023.

\* cited by examiner

 Resource elements not used

Option a) All data symbols omitted

Antenna ports / beam ports transmitting DSBs

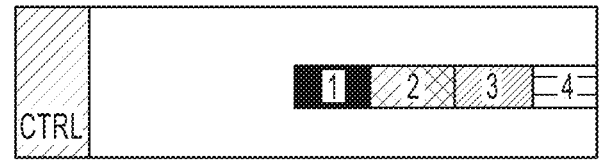

Option b) time domain symbols not having DSBs can be allocated for data

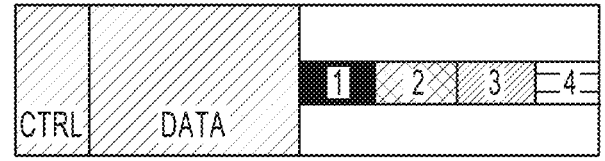

Fig. 7a

 Resource elements not used

Option a) Resource elements from frequency resources allocated for DSB omitted

Antenna ports / beam ports not transmitting DSBs

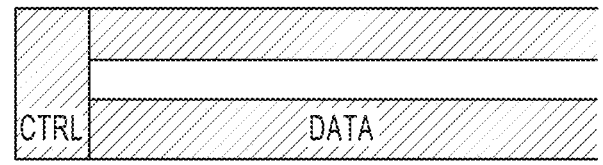

Option b) Resource elements allocated for DSB only omitted

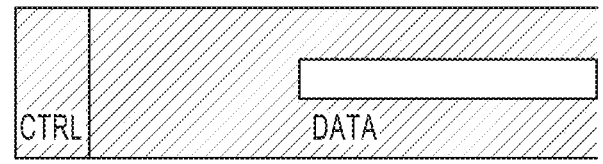

Fig. 7b

Frame conf. option a) DL and UL control symbol(s) in each subframe; DL control symbol(s) only in subframes DSBs are allocated Subframe
DL control
UL control Allocation area of DSB blocks (no guard periods taken into account)

Configuration:
Value1 = 4
Value2 = 2

Case 1: DSB blocks spread across 3 subframes (< Value1)
→ DL control remained in subframes DSBs are allocated Case 2: DSB blocks spread across 6 subframes (>Value1)
→ DL control remained on Value2 subframes on edges of the DSB allocation subframes

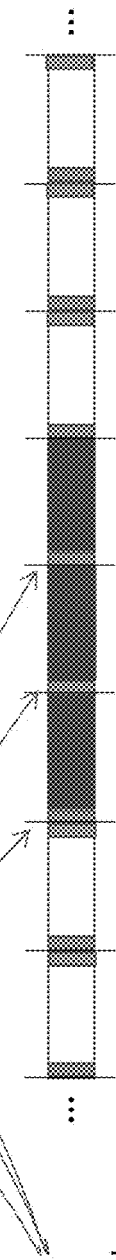
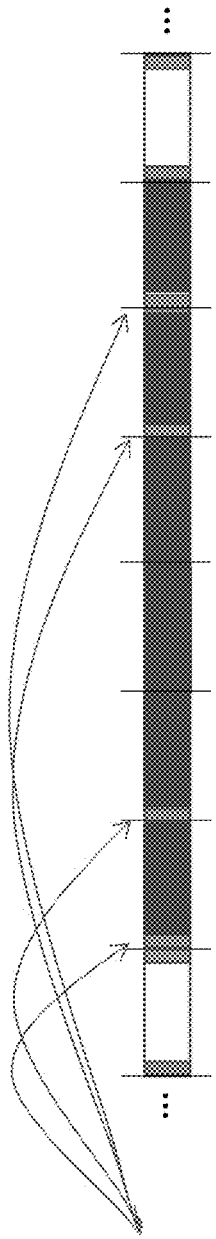

Fig. 12a

Frame conf. option b) DL and UL control symbol(s) in each subframe

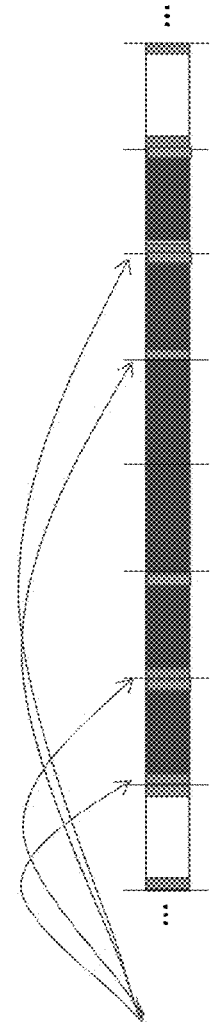

☐ Subframe
▨ DL control
▨ UL control
▨ Allocation area of DSB blocks (no guard periods taken into account)

Configuration:
Value1 = 4
Value2 = 2

Case 1: DSB blocks spread across 3 subframes (<Value1)
→ DL/UL control remained in subframes DSBs are allocated Case 2: DSB blocks spread across 6 subframes (>Value1)
→ DL/UL control remained on Value2 subframes on edges of the DSB allocation subframes In general, Value1 and Value2 may be different for downlink control and uplink control

Fig. 12b

DISCOVERY SIGNAL BLOCK MAPPING

CROSS-REFERENCE TO RELATED APPLICATIONS

This application is a continuation of U.S. application Ser. No. 16/705,905, filed Dec. 6, 2019, now U.S. Pat. No. 11,064,485, which is a continuation of U.S. application Ser. No. 14/993,296 filed on Jan. 12, 2016, now U.S. Pat. No. 10,536,940 issued on Jan. 14, 2020. The contents of these earlier filed applications are hereby incorporated by reference in their entirety.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), $5^{th}$ generation (5G) radio access technology, and/or High Speed Packet Access (HSPA). In particular, some embodiments may relate to frame structures for 5G cellular systems.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided in the evolved Node B (eNodeB or eNB) or many eNBs. Multiple eNBs may be involved for a single UE connection, for example, in case of Coordinated Multipoint Transmission (CoMP) and in dual connectivity.

Long Term Evolution (LTE) or E-UTRAN provides a new radio access technology and refers to the improvements of UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

In LTE (or LTE-A), there may be two downlink synchronization signals which are used by a UE to obtain cell identity and frame timing. These synchronization signals are referred to as the primary synchronization signal (PSS) and the secondary synchronization signal (SSS). The division of the synchronization signals into two signals is aimed at reducing the complexity of the cell search process.

5G (5th generation mobile networks) refers to the new generation of radio systems and network architecture delivering extreme broadband and ultra-robust, low latency network connectivity. 5G networks are expected to support data rates of several tens of megabits per second for tens of thousands of users, to support several hundreds of thousands of simultaneous connections for massive sensor deployments, to significantly enhance spectral efficiency compared to LTE, to improve coverage, to enhance signaling efficiency, and to significantly reduce latency compared to LTE.

SUMMARY

One embodiment includes a method, which may include configuring, by a network node, a group of discovery signaling blocks. The method may also include mapping the discovery signaling blocks of the group onto a subframe structure, including the group information into each of the discovery signaling blocks, and transmitting the discovery signaling blocks in the subframe structure.

Another embodiment is directed to an apparatus, which includes at least one processor and at least one memory comprising computer program code. The at least one memory and the computer program code are configured, with the at least one processor, to cause the apparatus at least to configure a group of discovery signaling blocks, map the discovery signaling blocks of the group onto a subframe structure, include the group information into each of the discovery signaling blocks, and transmit the discovery signaling blocks in the subframe structure.

Another embodiment is directed to an apparatus including configuring means for configuring a group of discovery signaling blocks, mapping means for mapping the discovery signaling blocks of the group onto a subframe structure, including means for including the group information into each of the discovery signaling blocks, and transmitting means for transmitting the discovery signaling blocks in the subframe structure.

Another embodiment is directed to a computer program embodied on non-transitory computer readable medium. The computer program is configured to control a processor to perform a process comprising configuring a group of discovery signaling blocks, mapping the discovery signaling blocks of the group onto a subframe structure, including the group information into each of the discovery signaling blocks, and transmitting the discovery signaling blocks in the subframe structure.

Another embodiment is directed to a method, which may include detecting, by a user equipment, one or more discovery signaling blocks. The method may also include determining a beam configuration applied for the detected one or more blocks, determining a group structure of the detected one or more discovery signaling blocks, determining a mapping of the detected one or more discovery signaling blocks on one or more subframes, determining a structure of the one or more subframes based on the determined group structure and determined mapping, and performing initial access to a cell based on the determining steps.

Another embodiment is directed to an apparatus, which includes at least one processor and at least one memory comprising computer program code. The at least one memory and the computer program code are configured, with the at least one processor, to cause the apparatus at least to detect one or more discovery signaling blocks, determine a beam configuration applied for the detected one or more blocks, determine a group structure of the detected one or more discovery signaling blocks, determine a mapping of the detected one or more discovery signaling blocks on one or more subframes, determine a structure of the one or more subframes based on the determined group structure and determined mapping, and perform initial access to a cell based on the determining steps.

Another embodiment is directed to an apparatus including detecting means for detecting one or more discovery signaling blocks, determining means for determining a beam configuration applied for the detected one or more blocks, determining means for determining the group structure of the detected one or more discovery signaling blocks, determining means for determining a mapping of the detected one or more discovery signaling blocks on one or more subframes, determining means for determining a structure of the one or more subframes based on the determined group structure and determined mapping, and performing means for performing initial access to a cell based on the determining steps.

Another embodiment is directed to a computer program embodied on non-transitory computer readable medium. The computer program is configured to control a processor to perform a process comprising detecting one or more discovery signaling blocks, determining a beam configuration applied for the detected one or more blocks, determining a group structure of the detected one or more discovery signaling blocks, determining a mapping of the detected one or more discovery signaling blocks on one or more subframes, determining a structure of the one or more subframes based on the determined group structure and determined mapping, and performing initial access to a cell based on the determining steps.

BRIEF DESCRIPTION OF THE DRAWINGS

For proper understanding of the invention, reference should be made to the accompanying drawings, wherein:

FIG. 7a illustrates options for resource element use for the antenna/beam ports transmitting DSBs, according to an embodiment;

FIG. 7b illustrates example options for resource element use for the antenna/beam ports not transmitting DSBs on the subframes where DSB resources are defined, according to an embodiment;

FIG. 12a illustrates an example block diagram of DSB block allocation, according to one embodiment;

FIG. 12b illustrates an example block diagram of DSB block allocation, according to another embodiment.

DETAILED DESCRIPTION

It will be readily understood that the components of the invention, as generally described and illustrated in the figures herein, may be arranged and designed in a wide variety of different configurations. Thus, the following detailed description of embodiments of systems, methods, apparatuses, and computer program products for signal block mapping, as represented in the attached figures, is not intended to limit the scope of the invention, but is merely representative of some selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments relate to frame structures for 5G cellular systems. 5G systems are expected to utilize a wide variety of different transceiver architectures that may range from low digital degree hybrid transceiver architectures to full digital solutions.

3GPP Technical Report 37.842, titled "Radio Frequency (RF) requirement background for Active Antenna System (AAS) Base Station (BS) (Release 12)," describes Base Station (BS) Radio Frequency (RF) requirements for Active Antenna System (AAS). The entire contents of the Technical Report (3GPP TR 37.842) is hereby incorporated by reference in its entirety.

Figure 1:
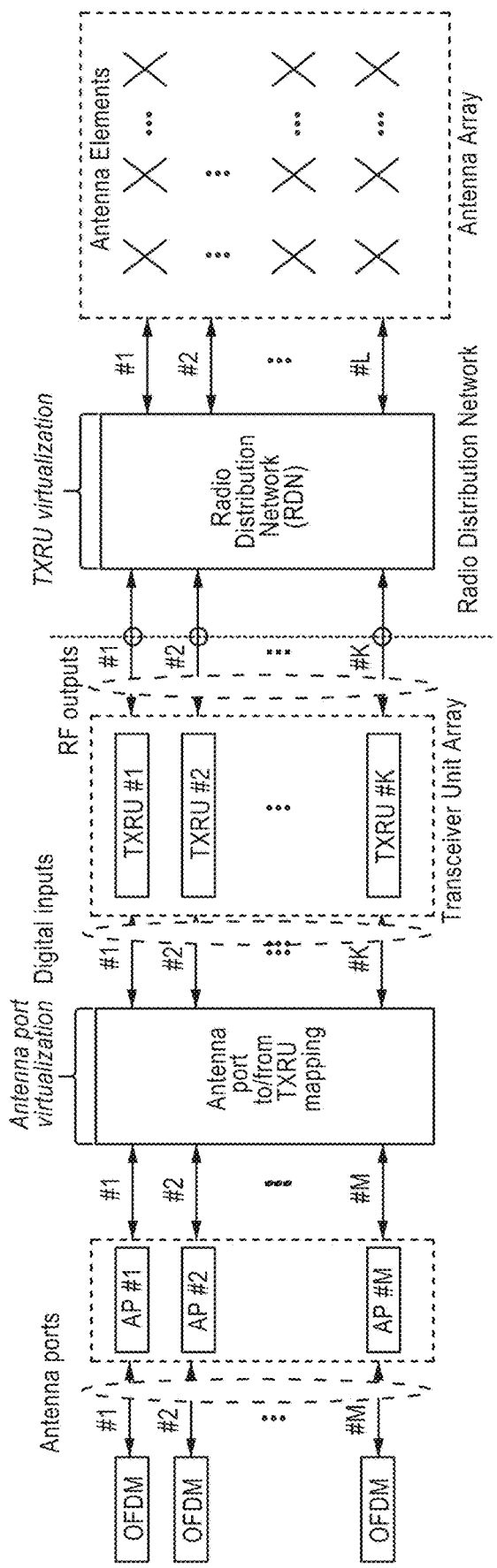
FIG. 1 illustrates an example of a general framework for radio architecture, according to an embodiment.

FIG. 1 illustrates an example of a general framework for radio architecture. As illustrated in the example of FIG. 1, one transmitter unit (TXU) can be connected to {1 ... L} antenna elements depending on the transceiver unit (TXRU) virtualization, i.e., the mapping between TXRUs and Antenna Elements. The mapping may be either sub-array or full connection. In the sub-array model, one TXRU is connected to subset of antenna elements where different subsets are disjoint; while in the full connection model, each TXRU is connected to each antenna element.

Radio distribution network (RDN) performs antenna virtualization in the radio frequency (RF) domain. Virtualization is not frequency selective but common to resource elements (REs) and signals. RDN may utilize either sub array or full connection mapping between TXRUs and Antenna Elements.

In the transmitting direction, M antenna ports feed K TXRUs, and K TXRUs feed L antenna elements where M≤K≤L. Complexity and power consumption of baseband processing and analog/digital (A/D) conversion likely limits the number of antenna ports M and TXRUs K to be much less than L in the centimetre/millimetre wave (cmWave/mmWave) system where L can be from tens up to hundreds (or even thousands). Power consumption of TXU (excluding PA) is mainly due to digital-to-analog converter (DAC) of which power consumption is linearly proportional to bandwidth and exponentially proportional to the number of analog-to-digital converter (ADC) bits ($P \sim B \times 2^{2R}$; where B is bandwidth and R is bits per sample). Typically, 16 bit ADCs are used, for example, in LTE. Thus, the power consumption of TXRU may limit the feasible number of TXRUs being less or significantly less than L. The number of TXRUs defines the number of signals that can be transmitted simultaneously per basic frequency resource like a subcarrier in an OFDM based system.

The framework illustrated in FIG. 1 may be used to describe digital beamforming, hybrid beamforming, and analog beamforming systems. In a digital Active Antenna System (AAS), one or more spatial layers per UE are provided, digital precoding only is supported, K=L (M≤K), and there is one-to-one mapping from TXRU to antenna element. In a hybrid Active Antenna System (AAS), one or more spatial layers per UE are provided, involves both analog and digital beamforming, K<L (M≤K), and there is one-to-many mapping from TXRU to antenna element. In an analog Active Antenna System (AAS), there is one spatial layer per UE, involves only analog beamforming (no digital precoding), M=1, K<L, and there is one-to-many mapping from TXRU to antenna element.

Figure 2:
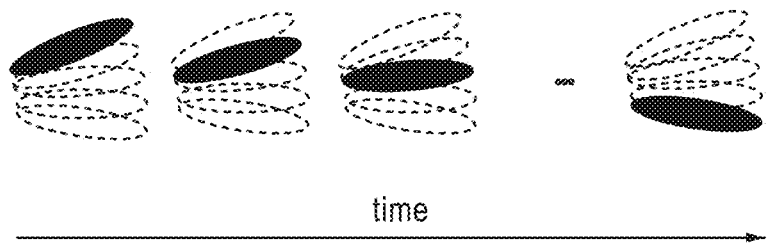
FIG. 2 illustrates an example of a sweeping operation, according to an embodiment.

The deployment scenario, carrier frequency and system bandwidth largely determine the selected transceiver architecture. Similarly, the mode of operation will see different options that will be used depending on the above parameters. In certain scenarios, the cell may operate using a sector wide antenna beam pattern, while in other scenarios the cell may need to operate using narrow beams to meet the required link budget. As a complement to conventional cellular systems, operating with narrow beams would apply also for common control signalling between base stations (BSs) and user equipment (UEs). Practically, that means transmitting downlink common signalling and receiving uplink common control signalling in a sweeping manner A target of the sweeping is to cover the whole sector by transmitting or receiving with one or multiple narrow beams at a time that can cover only portion of the sector, as illustrated in the example of a sweeping operation depicted in FIG. 2. On the other hand, the cell may operate using sector beams or in case of narrow beams, the number of beams and time slots to transmit common control signaling may differ from one BS to another.

A general problem addressed by certain embodiments is how to provide means to enable cell search and initial access in a way that the UE procedures remain the same independent of the cell operation mode and transceiver architecture at the BS. In other words, one objective is to build a common control signaling framework that can adapt to different transceiver architectures at the BS and number of beams and time slots needed for sweeping in case the BS operates in beam domain.

It may be assumed that certain discovery signaling block (s) allowing a UE to be able detect and measure the cell, as well as to be able to access to the cell will be defined. One block can be assumed to convey downlink common control signaling which can be transmitted in sweeping manner to the sector.

A more specific problem addressed by certain embodiments is how to map those discovery signaling blocks on the subframes in order to provide common control signaling that scales across different transceiver architectures, different sweeping structures (total number of beams, number of parallel beams) and different operation scenarios (such as cell type, cell loading situation, number of active UEs, the need for energy saving at UE/eNB, etc.).

Therefore, embodiments provide a scalable solution to map discovery signaling blocks on the subframes to enable BS transceiver architecture and antenna system agnostic initial access procedures.

According to one embodiment, a discovery signal block (DSB), such as common control signaling, may be transmitted by the eNB according to a predefined amount of time and frequency resources common to all subframe types (e.g., three time domain symbols are allocated for a given DSB on a certain bandwidth and the corresponding resource elements such as subcarriers). The DSB may be transmitted from the network by using the same RF beams. Each DSB may be self-detectable and self-decodable.

In certain embodiments, DSBs may be grouped together. One group may have one or multiple DSBs. Each DSB indicates its position within the group and provides the group's parameters. Configuration of DSB structure (how many DRBs in total and how many beams multiplexed per DSB) is configurable by the network. Configuration is not known a priori by UEs performing initial search and access (purpose is to enable agnostic initial search and access procedure for UE). Thus, each block may be self-detectable and self-decodable and provides UE information about beam and DSB structure, operation mode (etc.), and other such essential information and parameters to perform initial access. Grouping, as used herein, refers to a set of DSB blocks of which transmissions can cover the whole sector in spatial domain.

Figure 11:
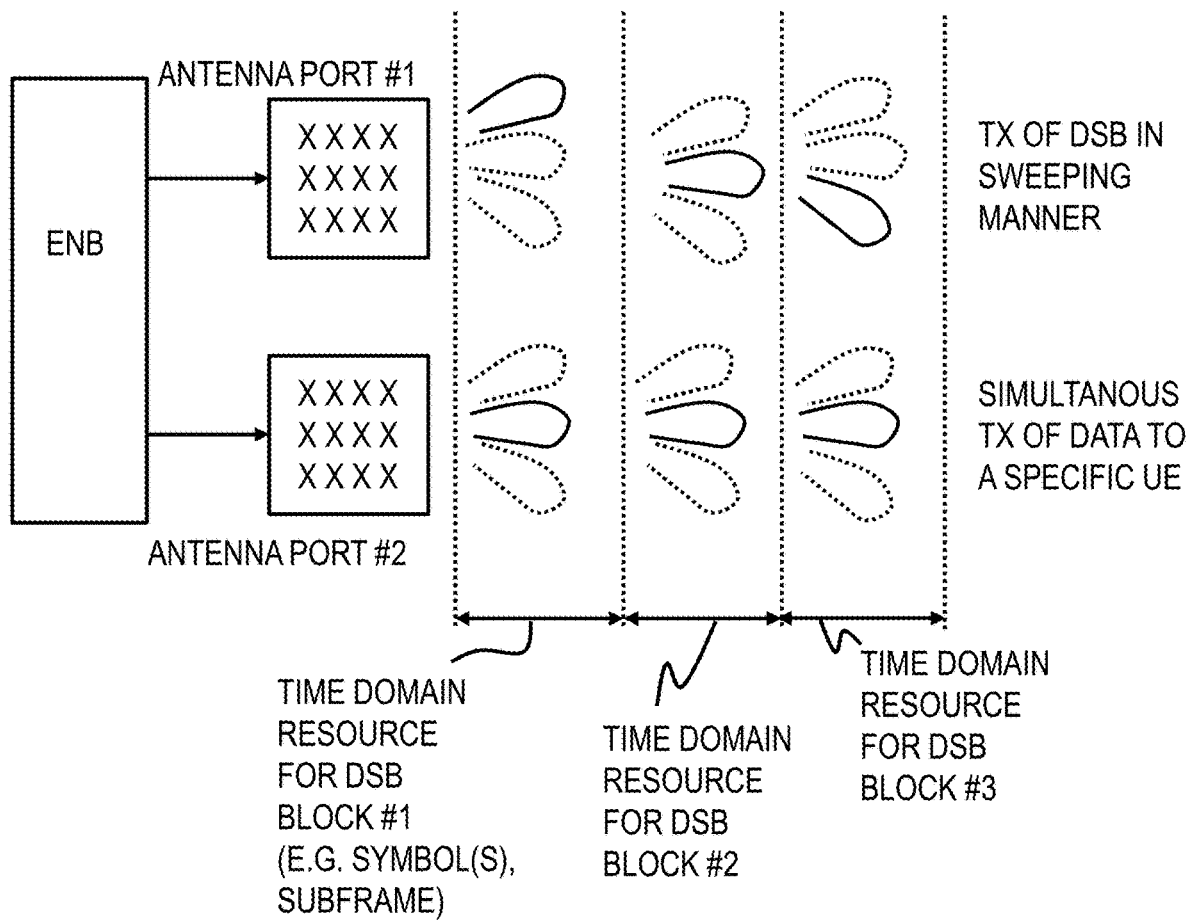
FIG. 11 illustrates an example of DSB grouping being associated with sweeping, according to an embodiment.

The grouping may, in one embodiment, be associated with sweeping, as illustrated in FIG. 11. There the number of DSBs is three, as a non-limiting example. For example, one DSB of the group is transmitted to one beam sector at a first time domain resource, which may be a subframe or a certain number (1, 2, 3, . . . N) of time domain symbols, a second DSB to a second sector, etc. In another embodiment, the eNB may transmit all DSBs of the group for every narrow beam sector. For example, each DSB may be sent simultaneously by multiple beams, possibly to different directions (up to BS implementation). Simultaneously transmitted beams may be next to each other in spatial domain or separated (like a comb in spatial domain generated from parallel beams). Thus, one DSB covers a portion of the sector. Association of the beams of the cell to DSBs is according to BS implementation. In one embodiment, the eNB may signal the association in each DSB block so that UE can learn the beam configuration of the cell. The UE detecting the one or more DSBs may then be able to identify beams of the block(s) (e.g. indices) among all the beams of the cell.

In one embodiment, location of DSBs within a DSB group in subframes (e.g., downlink (DL) only or Special-DL subframes) can be configured by the BS. If the size of the group is one, the DSB may be located in DL control symbols or shared among DL control and data symbols. This may be because likely such system is fully digital and operates with sector beams and can have frequency selective beamforming, while hybrid architectures may utilize sweeping. If the size of the group is greater than one, DSBs may be located in the space reserved for DL data symbols (within a subframe). Each DSB may indicate the position of the DSB within the group and total number of DSBs within the group.

According to one embodiment, subframes allocated for DSB transmissions may be used in a different manner by different transceiver units (antenna ports/beam ports), and the BS may change the number of transceiver units allocated for DSB transmission over time.

It is noted that, in certain embodiments, the DSB is mapped to a certain location in the subframe, and that certain antenna ports send the DSB periodically in a sweeping manner That may mean that the DSB is transmitted systematically over the whole cell with certain periodicity from these antenna ports/beams. However, for full digital architecture, the sweeping may not take place and sector beams, which can be digitally precoded, may be used instead. In addition, embodiments may provide simultaneous transmission of data and DSB in cases where the DSB covers only some part of the bandwidth.

In a first embodiment, transceiver and antenna system agnostic access methods and systems are provided. In this embodiment, a discovery signal block (DSB) is defined according to certain characteristics. For example, the DSB may have a predefined amount of time and frequency resources common to all subframe types and deployed architectures. The UE may assume that signals transmitted within a DSB are transmitted using the same RF beams at the BS, i.e. the BS is not allowed to change beamforming weights (digital and/or analog) within the DSB. For the UE, the property that it can assume signals transmitted using the same RF beams means that UE can determine beam level timing synchronization (PSS/SSS to acquire timing and beam RS/CSI-RS to beam acquisition). In co-operative multi-point (MP) scheme where multiple non-collocated remote radio heads share the same cell ID it may be beneficial in some scenarios if one block comprises beams only from one remote radio head (RRH) at a time so that UE can derive beam specific timing synchronization from synchronization signals, and radio head specific timing synchronization. DSB may also include information about mapping of beams transmitting DSB to transmission points of remote radio heads both in case RRH specific beams are in different DSBs or share the same DSBs.

In an embodiment, the DSB may comprise multiple signals, for instance: synchronization signals for timing and partial or full physical layer cell ID acquisition, data channel (e.g., physical broadcast channel), and/or antenna port/beam port specific reference signals for physical broadcast channel (PBCH) demodulation, beam detection, paging detection and channel state information (CSI) acquisition.

Further, each DSB may be self-detectable and self-decodable. It is also possible to combine or average signals corresponding to different DSB transmissions instants towards the same spatial direction.

DSBs may be grouped together (see FIG. 5 discussed below), and each DSB may indicate its relationship within the group. A group of DSBs may have the following properties: a group may have one (cell operates with sector wide beams) or multiple DSBs (cell operates with beams narrower than sector wide beams), a BS transmits a group of DSBs within a certain period where the period may be, for instance, periodicity UE can assume for synchronization signal per spatial direction. DSBs within a group can be spread within a subframe or across multiple subframes.

Figure 3:
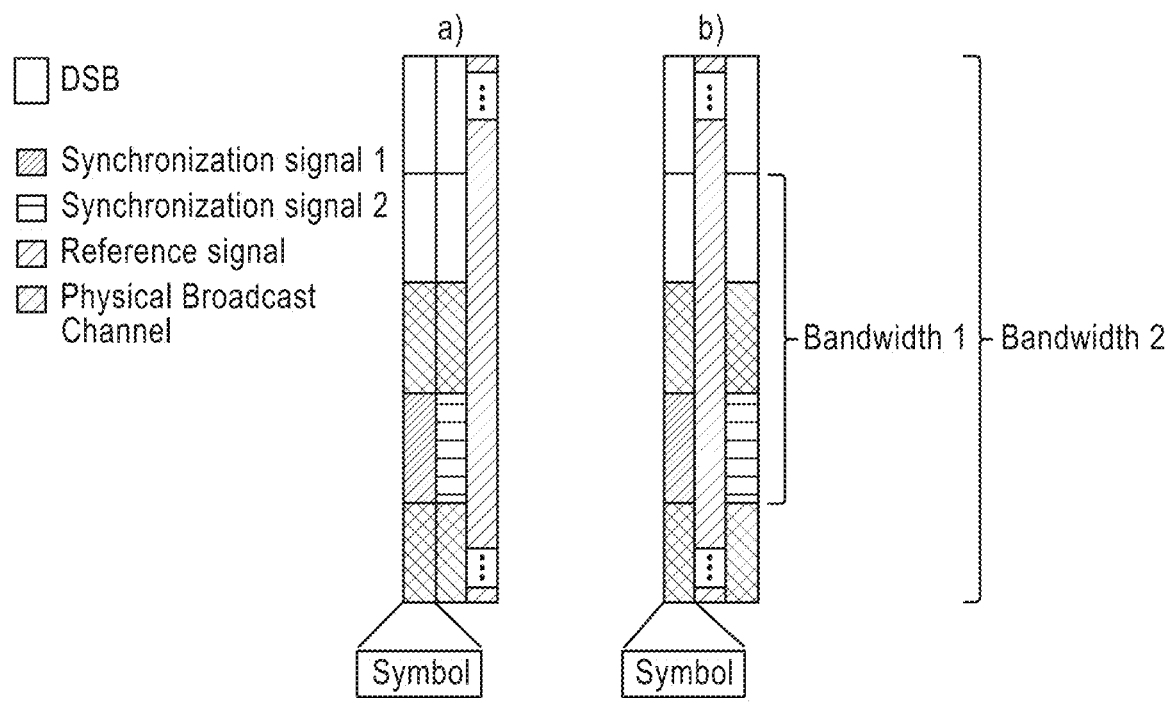
FIG. 3 illustrates an example of DSB implementation options, according to an embodiment.

FIG. 3 illustrates an example of DSB implementation options, according to an embodiment. As depicted in FIG. 3, a DSB may include a block capturing four signals: 2 synchronization signals, reference signal (beam reference signal/csi reference signal), and physical broadcast channel. It may also include signals and channels for paging support and distributing system information on frequency resources not reserved by synchronization signals and physical broadcast channel. As for physical broadcast channel, beam reference signal would be used as demodulation reference signal for other channels in the block as well. These frequency resources not reserved by synchronization signals and physical broadcast channel are depicted in FIG. 3 with the empty (white) blocks. The DSB in general can be seen to comprise also the shaded/marked blocks of FIG. 3. The size and content of the DSB block may vary per eNB implementation and per detected transmission needs in the cell. DSB is considered to have a fixed amount of time and frequency domain resources independent of the transceiver architecture and configuration of DSBs (in predetermined location within the carrier). In this example, three time domain symbols may be allocated for DSB and a bandwidth of Bandwidth 2. Bandwidth 2 may be, for example, a system bandwidth. Bandwidth 1 is a reduced bandwidth for certain signals and channels in DSB. DSB may comprise, for example, synchronization signal(s) for time and frequency synchronization, physical broadcast channel to convey system information, paging indicator and reference signal(s). In addition, there may be separate channels for most essential system information, paging and other system information distribution. Their periodicity may differ from each other, i.e. in certain block there may be only physical broadcast channel present while in some other block there may be physical broadcast channel, paging channel and channel for system information distribution present. All the signals and physical channels may be transmitted via multiple antenna ports in parallel. Antenna port/beam port specific reference signals may be allocated orthogonal resources in frequency (frequency domain multiplexing (FDM)/Interleaved FDM) and/or code domains Reference signals may be used for demodulation reference signals for PBCH detection, mobility measurements, beam detection, tracking and selection, CSI acquisition, etc. PBCH may be transmitted using transmit diversity method across parallel antenna/beam ports in order to use one set of resources per DSB. For cell search and physical broadcast channel detection, the UE may operate only using reduced bandwidth option, Bandwidth 1.

Figure 4:
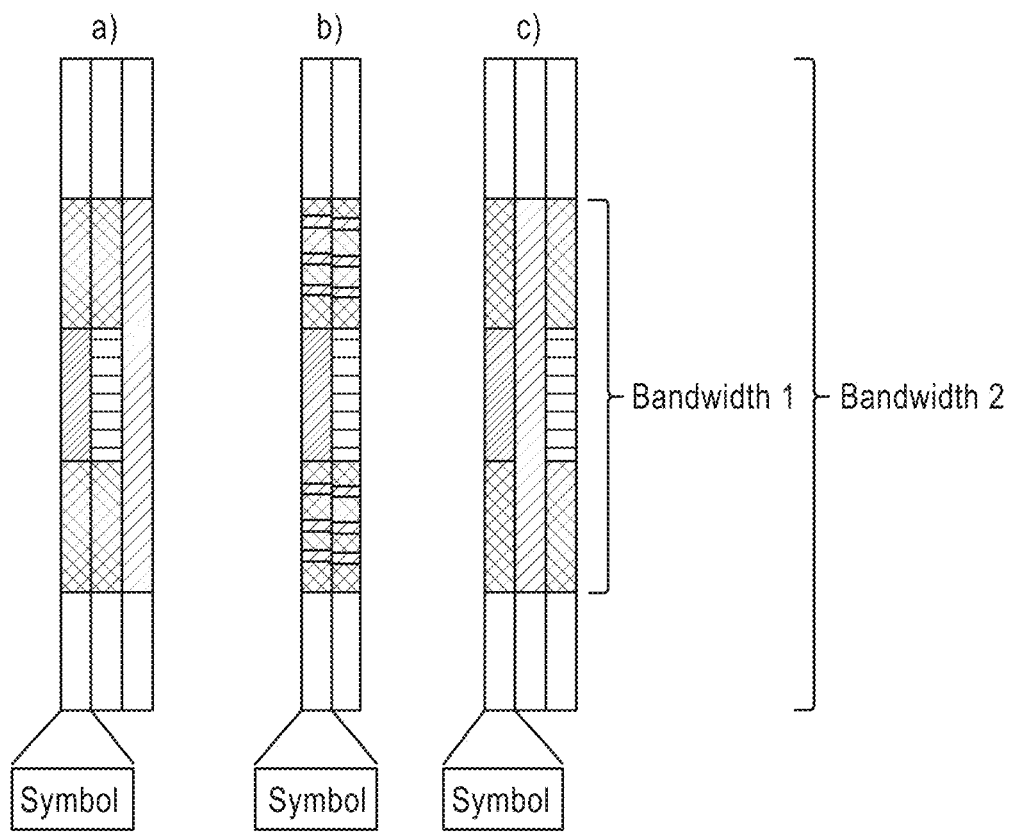
FIG. 4 illustrates further implementation options for DSB to enable narrowband structure, according to an embodiment.

FIG. 4 illustrates further implementation options for DSB to enable narrowband structure, according to an embodiment. The example of FIG. 4 may be used in case part of the transceiver resources (e.g., some antenna ports) are performing periodical DSB transmission while others (e.g., some of the other antenna ports) are transmitting dedicated UE signalling on the DSB subframes.

Figure 5:
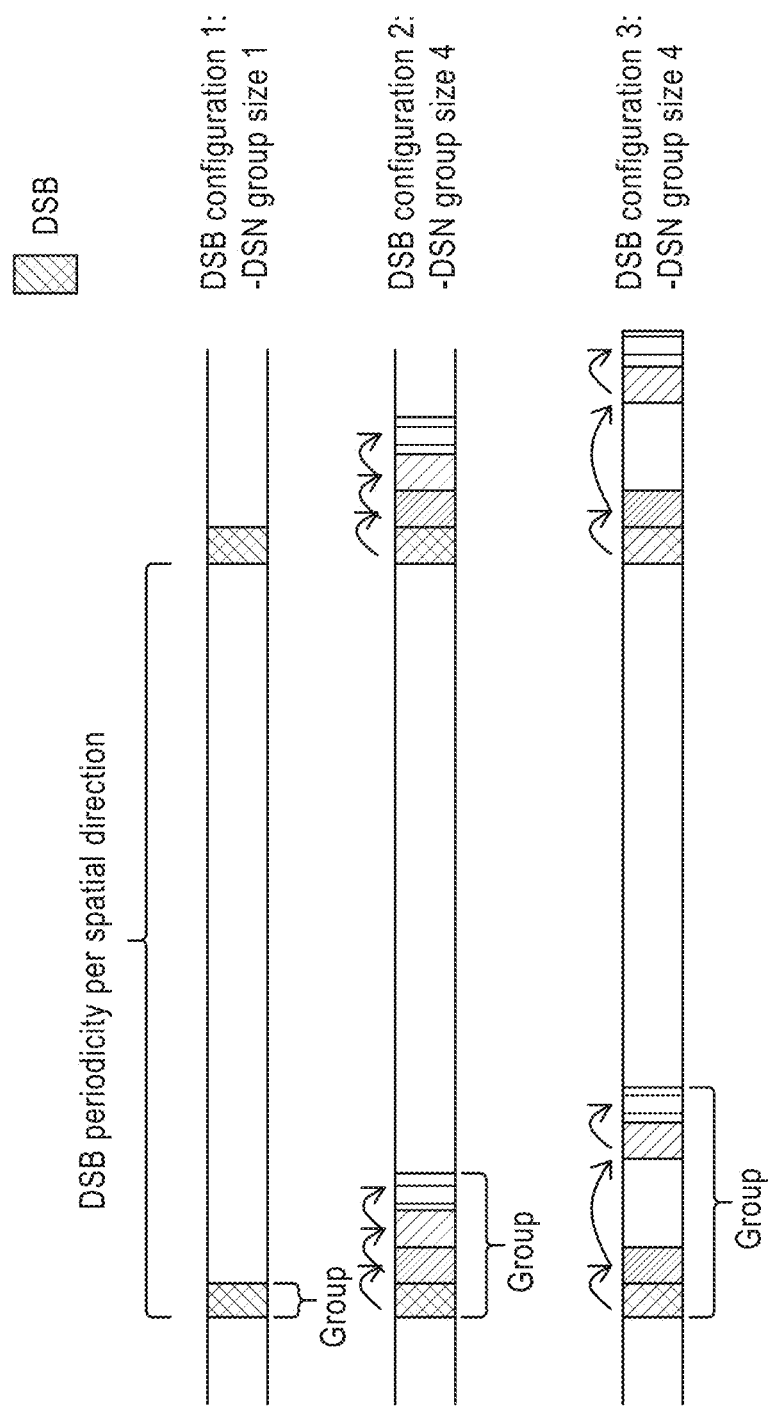
FIG. 5 illustrates configuration options for DSB groups, according to one embodiment.

FIG. 5 illustrates configuration options for DSB groups, according to one embodiment. As illustrated in FIG. 5, one group may have one or multiple DSBs. Each DSB indicates its position within the group and provides the group's parameters. DSBs within the group may be placed consecutively in time domain or may be discontinuously allocated in time. An opportunity for RF beam switching is provided between DSBs within a group. One OFDMA symbol may be reserved for such a guard time between DSB transmissions within a subframe. Other possibilities are to define certain number of samples for the explicit guard period or reuse first samples of the CP of the first symbol of the block for the guard period. Guard period used for link direction switching may also serve as a guard time between DSB transmissions (both within a subframe and between subframes).

In a second embodiment, configurability for DSB location within subframes is provided. Location of DSBs within a DSB group in subframes (e.g., DL only or S-DL subframes) may be configured by the BS. The configuration may depend on the architecture used at the BS, as well as depending on the operation mode, but the UE does not need any assumption prior cell search. Thus, the configuration of the location of DSBs can be performed in a UE agnostic manner.

According to an embodiment, the location of a DSB group may depend on the size of the group. For example, if the size of the group is one, the DSB may be located in DL control symbols or shared among DL control and data symbols. This is one possible configuration with digital architecture operating using sector beams because it minimizes consuming resource elements from data symbols while downlink control flexibility can be maintained because of having frequency selective digital beamforming capability at the BS.

If the size of the group is greater than one, the DSBs may be located in the space reserved for DL data symbols (within a subframe). For instance, DSB allocation may start from the end of the subframe (or from the end of DL data part of the subframe). This is a possible configuration with hybrid/analog architecture operating using narrow beams by not limiting flexibility for transmission of control symbols. It may be noted that demodulation reference signal (DMRS) may, in an embodiment, be located at the beginning of data part of the subframe (to facilitate fast detection at the receiver). In case of low number of DSBs that together fill only part of the subframe, filling from the end of the subframe may provide data transmission capability for data symbols preceding DSB blocks. Assuming demodulation RS would precede data symbols, unused data symbols due to DSB blocks would be more far away from DMRS than used ones. Furthermore, possibilities for having DMRS available in the "shorted subframe" can be maximized with this approach.

In an embodiment, the following rules may be defined for allocating DSB(s) of the DSB group into subframes. Each DSB may indicate the position of the DSB within the group and the total number of DSBs within the group. The maximum number of time domain DSB resources may be defined for subframe (e.g., 6). The maximum number may be needed in order for the UE to derive resource elements which are used by the DSB group in case DSBs within a group are spread across multiple subframes. In one example, the number can be fixed and defined in the specification for the subframe per subframe type (maximum number may depend on subframe type as well). In another example, the number can be defined by the BS/network system. In that case, each DSB would include information to the UE. This information (related to target cell) may also be included in a handover command to the UE. Another approach could be to use, for example, another RAT in case of multi-radio connectivity applied (UE could be connected to LTE when searching 5G cells and LTE provides information). According to one embodiment, if the number of DSBs within the group is greater than the maximum number of time domain DSB resources for the subframe, DSBs may be spread across consecutive subframes having downlink data symbols (e.g., consecutive DL only subframes). If the DSB group has only one DSB, it may be allocated into the downlink control symbols, partly over downlink control and partly over downlink data symbols, or anywhere in the subframe. In the case it is allocated anywhere in the subframe, the DSB includes information for the UE to derive its location (i.e., mapping information) in relation to current subframe structure. This may be needed as there may be a need to define DSB resources and subframe structure (including DL control resource dimensioning in the subframe) independently from each other. In some embodiments, the mapping information is implicit (such as DSB is always mapped to the last symbol(s) of the subframe), whereas in other cases the DSB includes an explicit indication of the mapping information. On the other hand, DSB may indicate (OFDM) symbol timing within the subframe. Hence, DSB may include indication about those symbol number(s) on the subframe on which the detected DSB block is allocated upon.

In one embodiment the UE may detect the subframe structure from the received DSB. One example is that DSB indicates for instance maximum number (max_num) of DBSs within subframe which may indicate indirectly how many symbols are actually allocated for downlink control in the subframe. For example, if max_num of DSBs within subframe is three, that could mean two control symbols, but if the max_num of DSBs within subframe is four that could mean only one downlink control symbol only. Further, certain value may indicate that there is no uplink control symbol in the subframe where at least one DSB is allocated.

Furthermore, if the number of DSBs within the group is greater than defined maximum number for allowed consecutive blocks, DSBs of the group may be allocated into clusters within the period. For example, if the maximum number for allowed consecutive blocks is 6 and there are 9 blocks in the group, 6 blocks are allocated consecutively in time and rest 3 blocks are allocated consecutively in time with some offset from the cluster of blocks defined by said first 6 blocks. For instance, the cluster of blocks defined by said second 3 blocks are allocated on the subframe(s) with time offset half of the period of the group to the said first cluster. Another example is to increase the periodicity of the DSBs by the number of created clusters of blocks. For example, if the basic periodicity is 6 ms, the BS has configured 24 blocks and the maximum number for allowed blocks is 8, three clusters of DSBs are created within the group. The clusters are separated by 2 ms from each other or alternatively, basic periodicity for each DSB is increased by factor of three to 18 ms and clusters are separated by 6 ms. In another alternative, maximum allowed consecutive blocks is configured to infinite and using above assumptions, all 24 blocks are allocated consecutively in time domain (potentially omitting downlink and/or uplink control symbols) and spread across multiple consecutive subframes.

Figure 6:
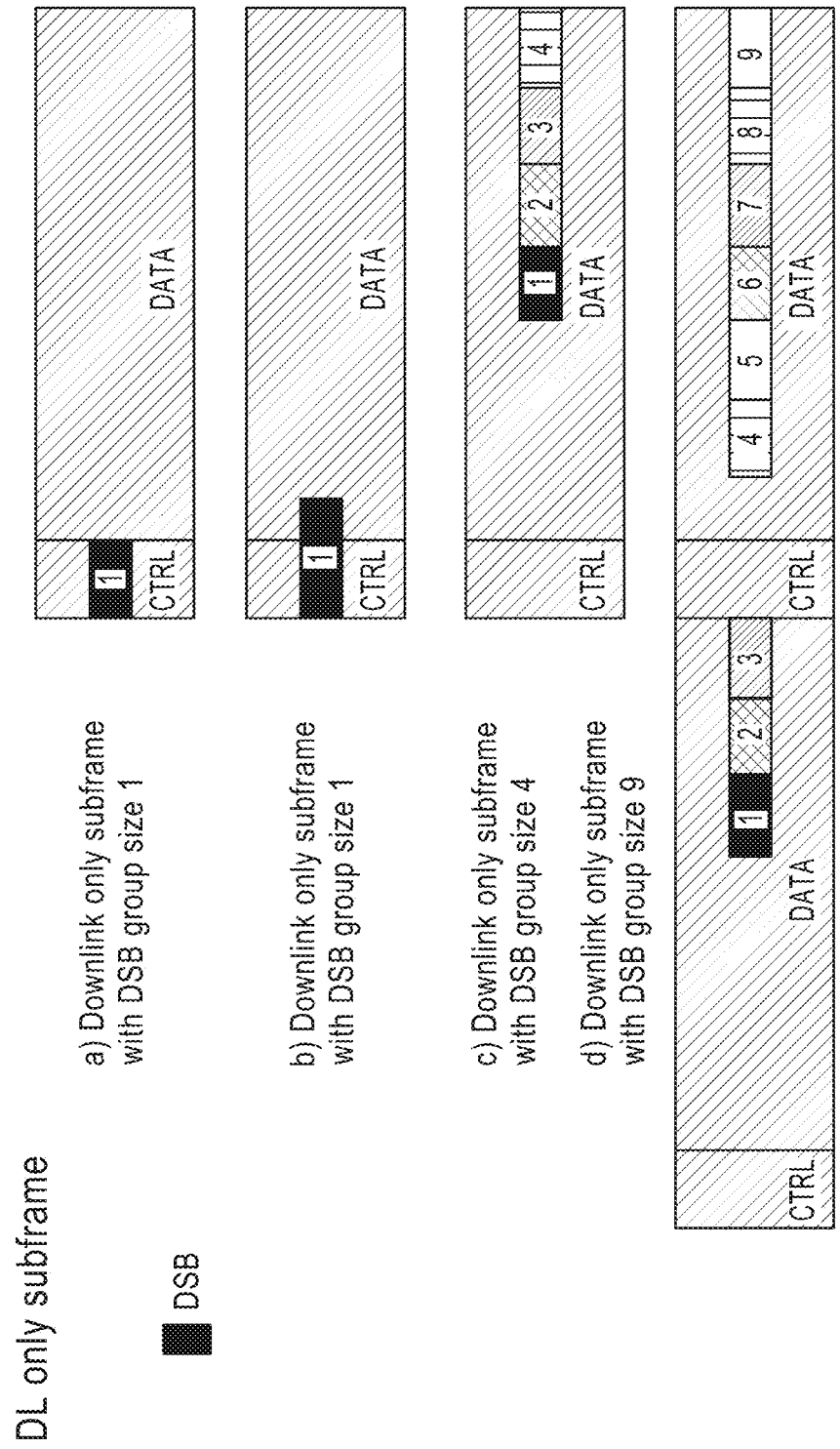
FIG. 6 illustrates example mappings of DSBs into subframe structures, according to an embodiment.

FIG. 6 illustrates example mappings of DSBs into subframe structures, according to an embodiment. In the example of FIG. 6, DSBs are depicted as narrowband blocks relative to the total system bandwidth. Alternatively, as discussed above, DSB block may have some signals that are allocated total system bandwidth. As one implementation option, beam RS bandwidth could be configurable and could be signaled via DSB. By default UE could always assume certain minimum bandwidth for beam RS in order to enable demodulation of PBCH using beam RS, initial measurements and beam selection when performing initial search and access to the cell. DSB may then indicate whether or not the beam RS is allocated over the full bandwidth or over narrow bandwidth.

In a third embodiment, adaptability of multiplexing of DSBs is provided. In this embodiment, subframes allocated for DSB transmissions may be used in different manner by different transceiver units (antenna ports/beam ports). For example, certain transceiver resources may transmit DSBs and certain transceiver resources may be used (simultaneously) for dedicated UE signaling (control and data) in those subframes. In this case, it may be desirable to define DSB to be narrow bandwidth block used by dedicated transceiver units while the rest of the system bandwidth could be used for dedicated signaling by other transceiver units (in other words to apply FDM between user data and DSB). For instance, one or two transceiver units may be allocated for sweeping DSBs while other transceiver units may be allocated for serving only dedicated UE signaling (control and data). In subframes DSBs are not transmitted, all transceiver units may be allocated for dedicated UE signaling.

The BS may change number of transceiver units allocated for DSB transmission over time. For example, when the cell is empty, the BS may minimize the sweeping time by multiplexing all beam ports into one DSB transmission; while, when the cell is serving a high number of UEs, DSB transmissions may be performed by, for example, one or two antenna/beam ports. Here it is assumed that a single beam provides enough EIRP for common control signaling from link budget/coverage point of view and thus multiple beams can be transmitted in parallel to different spatial directions. In case of narrowband DSB, a possibility is to allocate some antenna ports to transmit DSBs in parallel and other antenna ports to transmit user plane data at the same time on the frequency resources not reserved by DSBs. When the cell is empty, energy consumption is determined by the time the BS needs to have its transmitter(s) on. Thus, assuming certain total number of beams for full sweep, the sweep can be made shorter in time if more beams can be transmitted in parallel. Narrowband DSB would allow such configurability, for example when cell is empty the BS uses all the antenna ports in parallel for sweep, when there is load in the cell (high load), some APs perform sweeping while other perform user plane data transmission, thus preventing creation of data transmission gaps in downlink user plane transmissions due to sweeping.

As the DSB indicates the number of multiplexed beam ports per DSB and the total number of beam ports, the UE can derive the configuration of the transceiver units for DSB transmission to be able to track BS beams.

FIG. 7a illustrates options for resource element use for the antenna/beam ports transmitting DSBs, according to an embodiment. FIG. 7b depicts options for resource element use for the antenna/beam ports not transmitting DSBs on the subframes where DSB resources are defined, according to an embodiment. If PDSCH data allocation covers DSB region, the corresponding (dedicated) data/RS can be either rate matched or punctured around resource elements covering DSB region.

In case of narrowband DSB definition, one alternative may be to allocate DSB resource elements onto the edge of the system bandwidth to enable continuous allocation in frequency domain possibility for the antenna ports not transmitting DSBs on the subframes having DSB allocations. That would be beneficial, for instance, with single carrier transmission modulation schemes because DSBs are not in the middle of the system bandwidth to break frequency domain into two clusters.

Figure 8A:
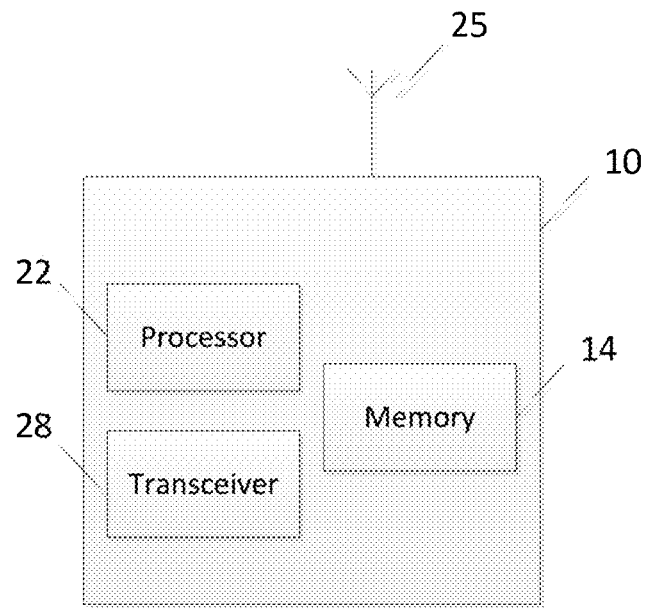
FIG. 8a illustrates an example block diagram of an apparatus, according to an embodiment.

FIG. 8a illustrates an example of an apparatus 10 according to an embodiment. In an embodiment, apparatus 10 may be a node, host, or server in a communications network or serving such a network. For example, in certain embodiments, apparatus 10 may be a network node or access node for a radio access network, such as a base station e.g., NodeB (NB) in UMTS or eNodeB (eNB) in LTE or LTE-A. However, in other embodiments, apparatus 10 may be other components within a radio access network. It should be noted that one of ordinary skill in the art would understand that apparatus 10 may include components or features not shown in FIG. 8a.

As illustrated in FIG. 8a, apparatus 10 includes a processor 22 for processing information and executing instructions or operations. Processor 22 may be any type of general or specific purpose processor. While a single processor 22 is shown in FIG. 8a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

In some embodiments, apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or access node, such as a base station in UMTS or an eNB in LTE or LTE-A, for example. According to certain embodiments, apparatus 10 may be controlled by at least one memory 14 and at least one processor 22 to configure a group of discovery signaling blocks (DSBs). Apparatus 10 may configure a DSB according to certain characteristics. For example, the DSB may have a predefined amount of time and frequency resources common to all subframe types and deployed architectures.

As mentioned above, in an embodiment, the DSB may comprise multiple signals, for instance: synchronization signals for timing and partial or full physical layer cell ID acquisition, data channel (e.g. physical broadcast channel), and/or antenna port/beam port specific reference signals for physical broadcast channel (PBCH) demodulation, paging detection, beam detection, and channel state information (CSI) acquisition. FIGS. 3 and 4 discussed in detail above illustrate examples of a DSB configuration.

In addition, DSBs may be grouped together as illustrated in FIG. 5 discussed above, and each DSB may indicate its relationship within the group. The group may include one or multiple DSBs. In an embodiment, apparatus 10 may configure the location of DSBs within a DSB group in subframes (e.g., DL only or S-DL subframes). According to one embodiment, DSBs of the group may be located consecutively in time or in a clustered manner in time. One DSB may include transmission of a plurality of signals from one or multiple radio frequency beams, and the one or more radio frequency beams used for the transmission of the signals in a given DSB are the same.

In an embodiment, apparatus 10 may be further controlled by at least one memory 14 and at least one processor 22 to map the DSBs of the group onto a subframe structure, and to include the group information into the DSBs. According to one embodiment, mapping information may also be included into the DSBs. In an embodiment, when mapping DSB(s) of the DSB group into subframes, each DSB may indicate the position of the DSB within the group (i.e., mapping information) and the total number of DSBs within the group (i.e., group information). According to one example, the maximum number of time domain DSB resources may be defined for a subframe. In one embodiment, the maximum number may be fixed and defined in the specification for the subframe. In another embodiment, the maximum number may be defined by apparatus 10. In one embodiment, apparatus 10 may be further controlled by at least one memory 14 and at least one processor 22 to transmit the DSBs in the subframe structure.

According to one embodiment, apparatus 10 may be controlled by at least one memory 14 and at least one processor 22 to map the DSBs onto the subframe structure based on a size of the group and/or based on the subframe structure type configured in the cell. In an embodiment, the DSBs are not allocated upon downlink and/or uplink control channel symbols if a number of subframes upon which blocks are mapped in a consecutive manner is below a given value.

Figure 12C:
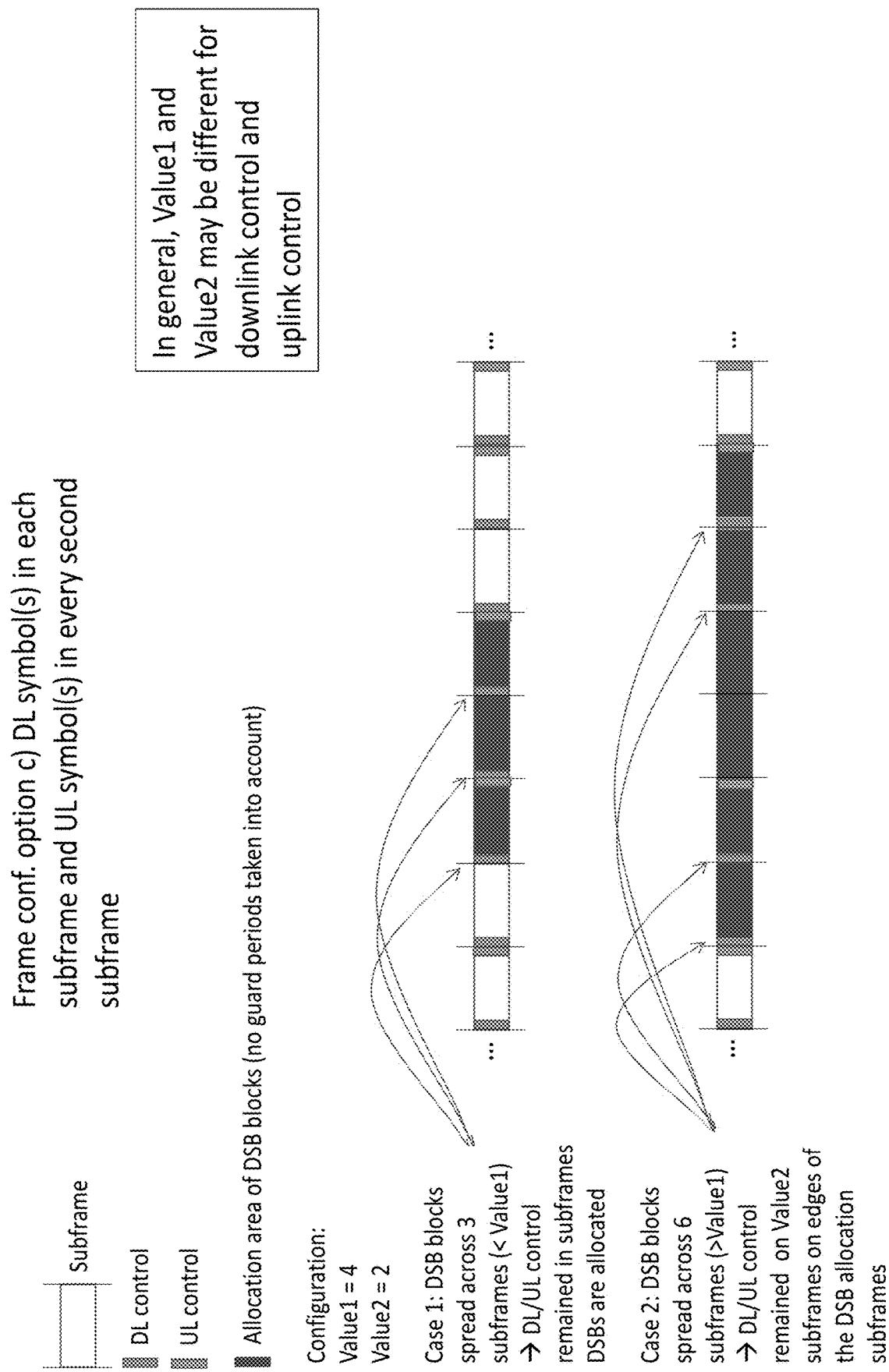
FIG. 12c illustrates an example block diagram of DSB block allocation, according to another embodiment.

When the number of consecutive subframes that the DSBs are allocated upon is greater than a given value, there may be another value indicating on how many subframes control symbols are remaining. FIGS. 12*a*, 12*b*, and 12*c* illustrate examples of DSBs allocation. For example, the first value could be 4 and the second value is 2, as non-limiting examples and other values are possible. These values may be pre-stored in the transmitting and receiving entities. In case the number of consecutive subframes is greater than four (=first value), e.g. six, then downlink control symbols are remained on the two (according to second value) edge subframes of the subframes DSBs are allocated upon and control symbols are omitted from other subframes. Alternatively, there may be some pattern on which subframes control symbols are remained in case the number of consecutive subframes DSBs are allocated is greater than given value (first value). The values may refer to a number of subframes. Downlink and uplink control symbols may be needed, for instance, for transmitting and receiving HARQ ack/nack feedback on previous subframes (data subframes) and sending scheduling grants for coming subframes.

Returning to FIG. 8*a*, in an embodiment, apparatus 10 may be controlled by at least one memory 14 and at least one processor 22 to map the DSBs in a subframe starting from the end of the data symbols, when the group size is greater than one. For example, the blocks of the group may be mapped upon last downlink symbols of the subframe. In another embodiment, apparatus 10 may be controlled by at least one memory 14 and at least one processor 22 to map the DSBs in a subframe starting from a downlink control symbol and/or downlink data symbol when the group size is one. Applying only one DSB block may mean that the BS can cover the whole sector at once. In one embodiment, in hybrid/analog beamforming, even if there is only one DSB block in the group, that one DSB may be situated at the end of the subframe (one or more of the last symbols of the subframe).

In one embodiment, the number of radio frequency beams per block may be configured by apparatus 10. According to one embodiment, at least one radio frequency beam is transmitting block and at least one other radio frequency block is transmitting data symbols simultaneously. Radio resources for DSBs and data symbols may be separated in frequency domain.

Figure 8B:
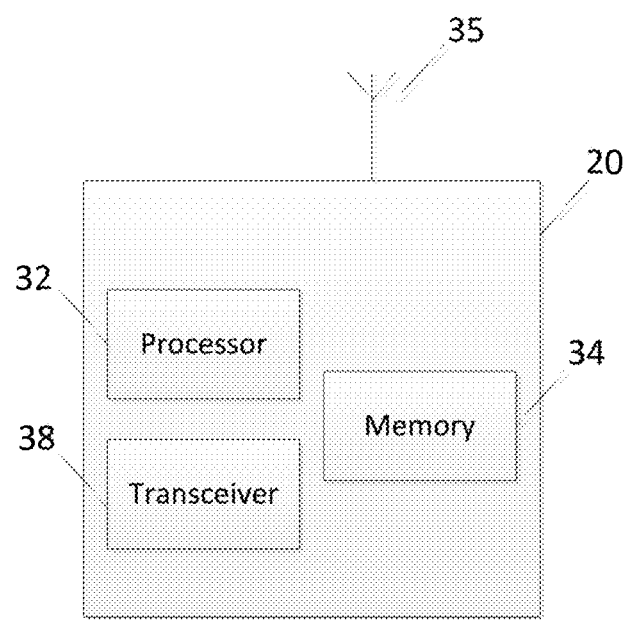
FIG. 8b illustrates an example block diagram of an apparatus, according to another embodiment.

FIG. 8*b* illustrates an example of an apparatus 20 according to another embodiment. In an embodiment, apparatus 20 may be a node or element in a communications network or associated with such a network, such as a UE, mobile device, mobile unit, machine type UE or other device. For instance, in some embodiments, apparatus 20 may be UE in LTE or LTE-A. It should be noted that one of ordinary skill in the art would understand that apparatus 20 may include components or features not shown in FIG. 8*b*.

As illustrated in FIG. 8*b*, apparatus 20 includes a processor 32 for processing information and executing instructions or operations. Processor 32 may be any type of general or specific purpose processor. While a single processor 32 is shown in FIG. 8b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device, such as a UE in LTE or LTE-A. In one embodiment, apparatus 20 may be controlled by at least one memory 34 and at least one processor 32 to detect one or more DSBs, determine a beam configuration applied for the detected one or more DSBs, determine the group structure of the detected one or more DSBs, and determine a mapping of the detected one or more DSBs on one or more subframes. Apparatus 20 may also be controlled by at least one memory 3 and at least one processor 32 to determine a structure of the one or more subframes based on the determined group structure and the determined mapping, and to perform initial access to a cell of the network based on the result of the determining steps.

Figure 9A:
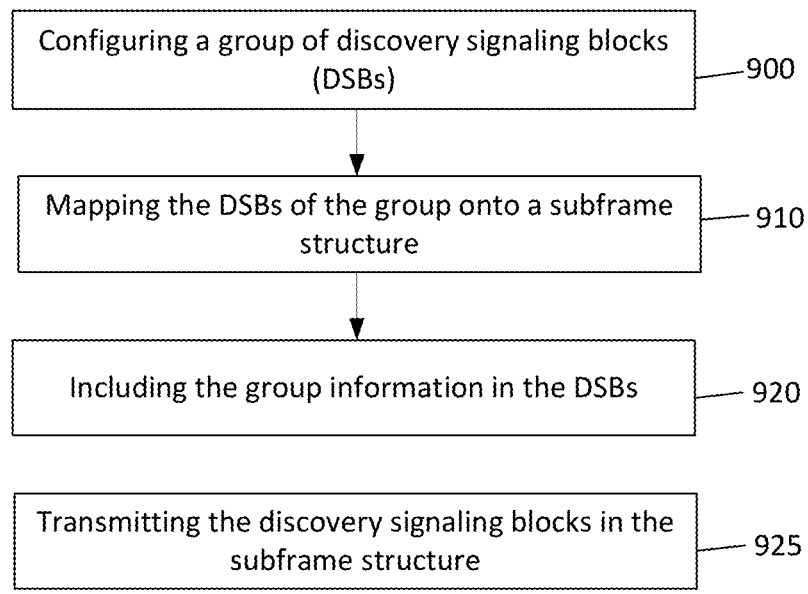
FIG. 9a illustrates a flow diagram of a method, according to an embodiment.

FIG. 9a illustrates an example flow diagram of a method, according to one embodiment of the invention. In certain embodiments, the method of FIG. 9a may be performed by a network node, such as a base station or eNB. As illustrated in FIG. 9a, the method may include, at 900, configuring a group of discovery signaling blocks (DSBs). The group of DSBs may be configured according to certain characteristics. For example, the DSB may have a predefined amount of time and frequency resources common to all subframe types and deployed architectures.

As mentioned above, in an embodiment, the DSB may comprise multiple signals, such as synchronization signals for timing and partial or full physical layer cell ID acquisition, data channel (e.g. physical broadcast channel), and/or antenna port/beam port specific reference signals for physical broadcast channel (PBCH) demodulation, paging detection, beam detection, and channel state information (CSI) acquisition.

In addition, DSBs may be grouped together as illustrated in FIG. 5 discussed above, and each DSB may indicate its relationship within the group. The group may include one or multiple DSBs. In an embodiment, the configuring may include configuring the location of DSBs within a DSB group in subframes (e.g., DL only or S-DL subframes). According to one embodiment, DSBs of the group may be located consecutively in time or in a clustered manner in time. One block may include transmission from one or multiple radio frequency beams.

In an embodiment, the method may further include, at 910, mapping the DSBs of the group onto a subframe structure, and, at 920, including the group information into each of the DSB(s). According to one embodiment, the including may further comprise including the mapping information in the DSBs. In an embodiment, when mapping DSB(s) of the DSB group into subframes, each DSB may indicate the position of the DSB within the group and the total number of DSBs within the group. According to one example, the maximum number of time domain DSB resources may be defined for a subframe. In one embodiment, the maximum number may be fixed and defined in the specification for the subframe. In another embodiment, the maximum number may be defined by the base station or eNB. The method may further include, at 925, transmitting the DSB(s) in the subframe structure.

According to one embodiment, the mapping may include mapping the DSBs onto the subframe structure based on a size of the group and/or based on the subframe structure type configured in the cell. In an embodiment, the DSBs are not allocated upon downlink and/or uplink control channel symbols if a number of subframes upon which blocks are mapped in a consecutive manner is below a given value. In an embodiment, the mapping may include mapping the DSBs in a subframe starting from the end of the data symbols, when the group size is greater than one. In another embodiment, the mapping may include mapping the DSBs in a subframe starting from a downlink control symbol and/or downlink data symbol when the group size is one.

In one embodiment, the number of radio frequency beams per block may be configured by the base station or eNB. According to one embodiment, at least one radio frequency beam is transmitting block and at least one other radio frequency block is transmitting data symbols simultaneously. Radio resources for DSBs and data symbols may be separated in frequency domain.

Figure 9B:
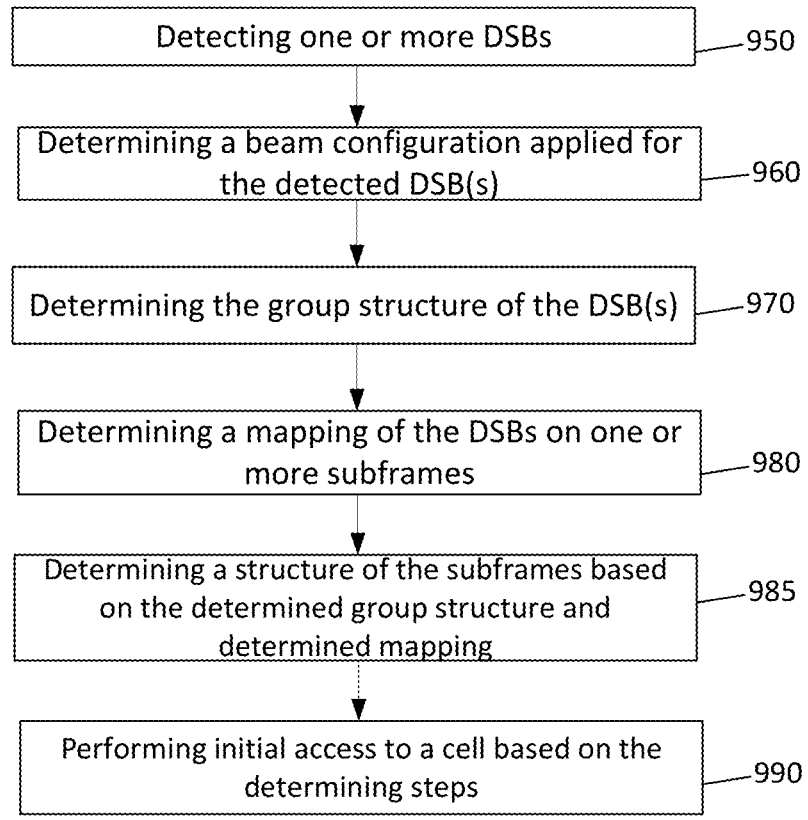
FIG. 9b illustrates a flow diagram of a method, according to another embodiment.

FIG. 9b illustrates an example flow diagram of a method, according to another embodiment of the invention. In certain embodiments, the method of FIG. 9b may be performed by a device, such as a UE in LTE or LTE-A. As illustrated in FIG. 9b, the method may include, at 950, detecting one or more DSBs. At 960, the method may include determining a beam configuration applied for the detected one or more DSBs. The method may further include, at 970, determining the group structure of the detected one or more DSBs, and, at 980, determining a mapping of the detected one or more DSBs on one or more subframes. The method may also include, at 985, determining a structure of the one or more subframes based on the determined group structure and the determined mapping. The method may then include, at 990, performing initial access to a cell of the network based on the result of the determining steps.

Figure 10A:
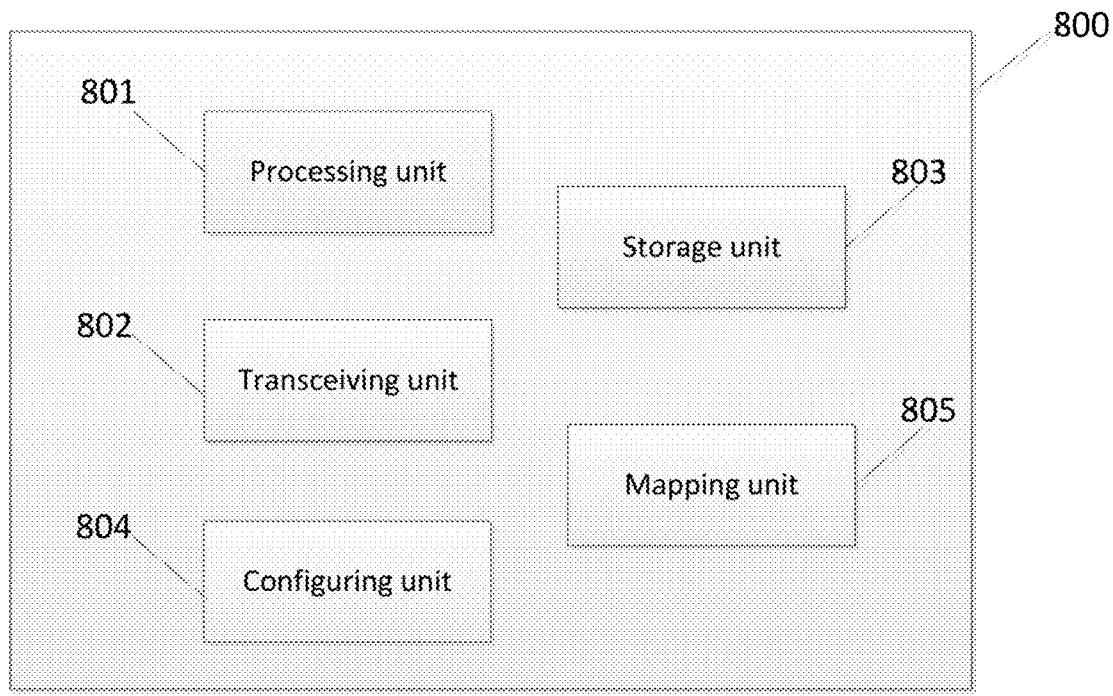
FIG. 10a illustrates an example block diagram of an apparatus, according to another embodiment.

FIG. 10a illustrates a block diagram of an apparatus 800, according to one embodiment. As illustrated in the example of FIG. 10a, apparatus 800 may include a processing unit or means 801 for controlling apparatus 800 and for carrying out instructions of a computer program, for example, by performing arithmetic, logical, control and input/output (I/O) operations specified by the instructions. Apparatus 800 may also include a storage unit or means 803 for storing information including, but not limited to, computer program instructions or software modules that provide functionality when executed by processing unit 801. Apparatus 800 may further include a transceiving unit or means 802 for receiving or transmitting information. Apparatus 800 may also include a configuring unit or means 804 and a mapping unit or means 805. In an embodiment, the configuring unit 804 may configure a group of discovery signaling blocks (DSBs). The group of DSBs may be configured according to certain characteristics. For example, the DSB may have a predefined amount of time and frequency resources common to all subframe types and deployed architectures.

The group may include one or multiple DSBs. In an embodiment, the configuring unit 804 may configure the location of DSBs within a DSB group in subframes (e.g., DL only or S-DL subframes). According to one embodiment, DSBs of the group may be located consecutively in time or in a clustered manner in time. One block may include transmission from one or multiple radio frequency beams.

In an embodiment, mapping unit 805 may map the DSBs of the group onto a subframe structure. The configuring unit 804 may cause the including of the group information and optionally the mapping information into the DSBs. In an embodiment, when mapping DSB(s) of the DSB group into subframes, each DSB may indicate the position of the DSB within the group and the total number of DSBs within the group. According to one example, the maximum number of time domain DSB resources may be defined for a subframe. In one embodiment, the maximum number may be fixed and defined in the specification for the subframe. In another embodiment, the maximum number may be defined by apparatus 800. Transceiving unit or means 802 may cause the transmitting of the DSBs in the subframe structure.

According to one embodiment, the mapping unit 805 may map the DSBs onto the subframe structure based on a size of the group and/or based on the subframe structure type configured in the cell. In an embodiment, the DSBs are not allocated upon downlink and/or uplink control channel symbols if a number of subframes upon which blocks are mapped in a consecutive manner is below a given value. In an embodiment, the mapping unit 805 may map the DSBs in a subframe starting from the end of the data symbols, when the group size is greater than one. In another embodiment, the mapping unit 805 may map the DSBs in a subframe starting from a downlink control symbol and/or downlink data symbol when the group size is one.

In one embodiment, the number of radio frequency beams per block may be configured by the base station or eNB. According to one embodiment, at least one radio frequency beam is transmitting block and at least one other radio frequency block is transmitting data symbols simultaneously. Radio resources for DSBs and data symbols may be separated in frequency domain.

Figure 10B:
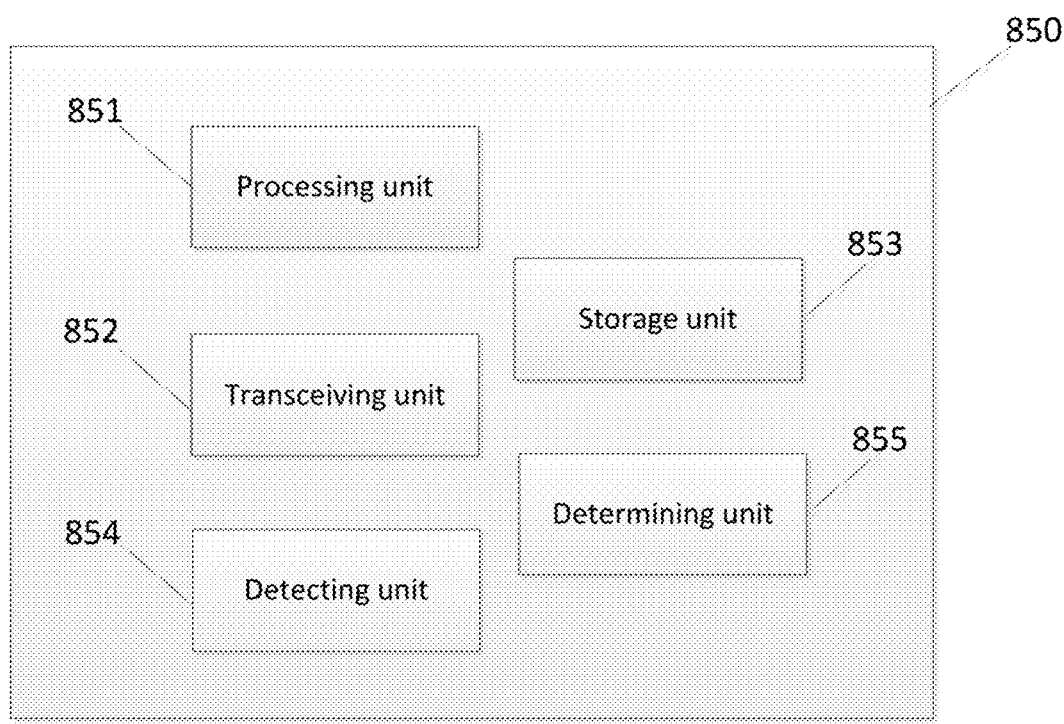
FIG. 10b illustrates an example block diagram of an apparatus, according to another embodiment.

FIG. 10b illustrates a block diagram of an apparatus 850, according to one embodiment. As illustrated in the example of FIG. 10b, apparatus 850 may include a processing unit or means 851 for controlling apparatus 850 and for carrying out instructions of a computer program, for example, by performing arithmetic, logical, control and input/output (I/O) operations specified by the instructions. Apparatus 850 may also include a storage unit or means 853 for storing information including, but not limited to, computer program instructions or software modules that provide functionality when executed by processing unit 851. Apparatus 850 may further include a transceiving unit or means 852 for receiving or transmitting information. Apparatus 850 may also include a detecting unit 854 and a determining unit 855.

In an embodiment, detecting unit 854 may detect one or more DSBs. Determining unit 855 may determine a beam configuration applied for the detected one or more blocks, determine the group structure of the detected one or more DSBs, determine a mapping of the detected one or more DSBs on one or more subframes, and determine a structure of the one or more subframes based on the determined group structure and the determined mapping. The transceiving unit or means 852 may cause the performing of initial access to a cell of the network based on the result of the determining steps.

Embodiments of the invention provide several advantages and technical improvements. For example, embodiments support all possible BS architectures (fully digital, hybrid, fully analog). In addition, embodiments are UE agnostic. In other words, the UE does not need to know the BS architecture in advance. Further, embodiments may support both beamformed and conventional (sector beam approach) approaches for the common control plane (PBCH, PRACH). Certain embodiments have built-in support for efficient usage of BS TXRU (and other hardware resources). Also, embodiments allow for minimizing the duration of one sweep of beamformed control channel transmission. Hence, it has a positive impact on the UEs power consumption (i.e., UE power consumption is reduced). Additionally, embodiments allow simultaneous transmission of data and DSB. This will minimize the system overhead of DSB transmission.

According to embodiments, programs, also called program products or computer programs, including software routines, applets and macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it. Modifications and configurations required for implementing functionality of an embodiment may be performed as routine(s), which may be implemented as added or updated software routine(s). Software routine(s) may be downloaded into the apparatus.

Software or a computer program code or portions of it may be in a source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other embodiments, the functionality of any method or apparatus described herein may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that may be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. An apparatus, comprising:
at least one processor; and
at least one memory comprising computer program code,
the at least one memory and the computer program code are configured, with the at least one processor, to cause the apparatus at least to
detect in a subframe structure one or more discovery signaling blocks associated with indices, wherein a discovery signaling block comprises at least a synchronization signal and a physical broadcast channel;
based on the associated indices of the one or more detected discovery signaling blocks, determine a group structure of the discovery signaling blocks;
based on the group structure of the discovery signaling blocks, determine a beam among the beams of a cell;
determine a time domain structure of one or more subframes; and
perform an initial access to the cell based on the one or more detected discovery signaling blocks, the determined beam and the time domain structure of the one or more subframes.

2. The apparatus according to claim 1, wherein one or multiple of the discovery signaling blocks are included in a group.

3. The apparatus according to claim 2, wherein the discovery signaling blocks comprise group information comprising information on how many discovery signaling blocks are in the group.

4. The apparatus according to claim 2, wherein the one or multiple discovery signaling blocks of the group are located consecutively in time or in a clustered manner in time.

5. The apparatus according to claim 2, wherein the discovery signaling blocks are mapped in a subframe starting from the end of the data symbols, when a size of the group is greater than one.

6. The apparatus according to claim 2, wherein the discovery signaling blocks are mapped in a subframe on at least one of a downlink control symbol or downlink data symbol when a size of the group is one.

7. The apparatus according to claim 1, wherein the discovery signaling blocks comprise mapping information that indicates where a discovery signaling block is located in the subframe structure.

8. The apparatus according to claim 1, wherein at least one of the discovery signaling blocks comprises transmission of a plurality of signals from one or multiple radio frequency beams, and the one or multiple radio frequency beams used for the transmission of the signals in a given discovery signaling block are the same.

9. The apparatus according to claim 1, wherein each of the discovery signaling blocks is self-detectable or self-decodable.

10. A method, comprising:
detecting in a subframe structure one or more discovery signaling blocks associated with indices, wherein a discovery signaling block comprises at least a synchronization signal and a physical broadcast channel;
based on the associated indices of the one or more detected discovery signaling blocks, determining a group structure of the discovery signaling blocks;
based on the group structure of the discovery signaling blocks, determining a beam among the beams of a cell;
determining a time domain structure of one or more subframes; and
performing an initial access to the cell based on the one or more detected discovery signaling blocks, the determined beam and the time domain structure of the one or more subframes.

11. The method according to claim 10, wherein one or multiple of the discovery signaling blocks are included in a group.

12. The method according to claim 11, wherein the discovery signaling blocks comprise group information comprising information on how many discovery signaling blocks are in the group.

13. The method according to claim 11, wherein the one or multiple discovery signaling blocks of the group are located consecutively in time or in a clustered manner in time.

14. The method according to claim 10, wherein the discovery signaling blocks comprise mapping information that indicates where a discovery signaling block is located in the subframe structure.

15. The method according to claim 10, wherein a discovery signaling block comprises transmission of a plurality of signals from one or multiple radio frequency beams, and the one or multiple radio frequency beams used for the transmission of the signals in a given discovery signaling block are the same.

16. The method according to claim 10, wherein each of the discovery signaling blocks is self-detectable or self-decodable.

17. An apparatus, comprising:
at least one processor; and
at least one memory comprising computer program code,
the at least one memory and the computer program code are configured, with the at least one processor, to cause the apparatus at least to
configure, in a subframe structure, one or more discovery signaling blocks associated with indices, wherein a discovery signaling block comprises at least a synchronization signal and a physical broadcast channel;
map the discovery signaling blocks onto the subframe structure;
include group information into each of the discovery signaling blocks; and
transmit the discovery signaling blocks in the subframe structure.

18. The apparatus according to claim 17, wherein, to include the group information, the at least one memory and the computer program code are configured, with the at least one processor, to cause the apparatus at least to include mapping information which indicates where a discovery signaling block is located in the subframe structure.

19. The apparatus according to claim 17, wherein the group information comprises information on how many discovery signaling blocks are in a group of discovery signaling blocks.

20. The apparatus according to claim 17, wherein at least one of the discovery signaling blocks comprises transmission of a plurality of signals from one or multiple radio frequency beams, and the one or multiple radio frequency beams used for the transmission of the signals in a given discovery signaling block are the same.

* * * * *